United States Patent
Ahadian et al.

(10) Patent No.: US 8,499,281 B2
(45) Date of Patent: *Jul. 30, 2013

(54) IDENTIFYING IMPACT OF DATABASE CHANGES ON AN APPLICATION

(75) Inventors: Azadeh Ahadian, San Jose, CA (US); Stephen A. Brodsky, Los Gatos, CA (US); Michael G. Burke, Yonkers, NY (US); Zeus Courtois, Laredo, TX (US); Tony K. Leung, San Jose, CA (US); Rebecca B. Nin, Morgan Hill, CA (US); Igor Peshansky, Emerson, NJ (US); Sonali Surange, San Rafael, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/404,886

(22) Filed: Feb. 24, 2012

(65) Prior Publication Data

US 2012/0159433 A1 Jun. 21, 2012

Related U.S. Application Data

(63) Continuation of application No. 12/255,946, filed on Oct. 22, 2008.

(51) Int. Cl.
*G06F 9/44* (2006.01)
*G06F 7/00* (2006.01)

(52) U.S. Cl.
USPC ........... 717/113; 717/109; 707/617; 707/634; 707/803

(58) Field of Classification Search
None
See application file for complete search history.

(56) References Cited

U.S. PATENT DOCUMENTS

| | | | | |
|---|---|---|---|---|
| 5,671,407 | A | * | 9/1997 | Demers et al. ................... 1/1 |
| 6,985,905 | B2 | * | 1/2006 | Prompt et al. ............... 707/829 |
| 7,174,536 | B1 | * | 2/2007 | Kothari et al. .............. 717/109 |
| 2006/0155747 | A1 | * | 7/2006 | Olivieri et al. .............. 707/102 |
| 2008/0147704 | A1 | | 6/2008 | Godwin et al. |
| 2009/0037873 | A1 | * | 2/2009 | Ahadian et al. ............. 717/105 |
| 2010/0114962 | A1 | * | 5/2010 | Ahadian et al. ............. 707/782 |
| 2010/0293523 | A1 | * | 11/2010 | Ahadian et al. ............. 717/108 |
| 2011/0208785 | A1 | * | 8/2011 | Burke et al. ................. 707/803 |
| 2011/0225122 | A1 | * | 9/2011 | Denuit et al. ................ 707/634 |

(Continued)

FOREIGN PATENT DOCUMENTS

EP 1480135 A2 11/2004

OTHER PUBLICATIONS

Andy Maule, "Impact Analysis of Database Schema Changes", [Online], 2009, pp. 1-188, [Retrieved from Internet on Oct. 6, 2012], <http://research.microsoft.com/pubs/118211/andy%20maule%20-%20thesis.pdf>.*

(Continued)

*Primary Examiner* — Thuy Dao
*Assistant Examiner* — Ziaul A Chowdhury
(74) *Attorney, Agent, or Firm* — Patterson & Sheridan, LLP

(57) ABSTRACT

A technique is disclosed for identifying impact of database changes on an application. Given a proposed database change, affected source code is identified that is affected by the proposed database change. References to the affected source code are created and organized into a hierarchy. A user can ascertain the extent of the impact by viewing the hierarchy and by using the hierarchy to access and view the affected source code in a visually distinct manner.

20 Claims, 9 Drawing Sheets

U.S. PATENT DOCUMENTS

2011/0271250 A1* 11/2011 Park et al. ............... 717/113
2012/0159433 A1* 6/2012 Ahadian et al. .......... 717/113
2012/0179728 A1* 7/2012 Harris ..................... 707/803
2012/0185430 A1* 7/2012 Yao et al. ................. 707/617

OTHER PUBLICATIONS

Deruelle L. et al., "A Change Imapact Analysis Approch for Corba Based Federated Database" [Online], 2000, pp. 949-958, [Retrieved from Internet on Oct. 6, 2012], <http://www.springerlink.com/content/f9kfrcmq04rvq24e/fulltext.pdf.*

Bassel Daou et al., "Regression Testing of Database Applications", 2001, p. 285-290, [Retrieved from Internet on Oct. 6, 2012], <http://web.cs.du.edu/~sazghand/background_chap_papers/Regression%20testing%20of%20database%20applications.pdf>.*

Amela Karahasanovic, "Identifying Impacts of Database Schema Changes on Applications" [Online], Apr. 16, 2001, pp. 1-12, [Retrieved from Internet on Mar. 14, 2013], <http://ftp.mi.fu-berlin.de/reports/tr-b-01-04/karahasanovic.pdf>.*

Amela Karahasanovic et al.,"Visualizaing Impacts of Database Schema Changes a Controlled Experiment",[Online] , 2001, pp. 358-365, [Retrieved from Internet on Mar. 14, 2013], <http://ieeexplore.ieee.org/stamp/stamp.jsp?tp=&arnumber=995292>.*

Deruelle L. et al., "Local and Federated Database Schemas Evolution. An Impact propagation Model", [Online], 1999, pp. 1-12, [Retrieved from Internet on Mar. 15, 2013], <http://citeseerx.ist.psu.edu/viewdoc/download?doi=10.1.1.40.5303&rep=rep1&type=pdf>.*

Carlo A. Curino et al., "Graceful Database Schema Evolution: the PRISM Workbench", [Online], 2008, pp. 1-12, [Retrieved from Internet on Mar. 15, 2013], <http://www.cs.ucla.edu/~zaniolo/papers/prism-vldb2008-cameraready.pdf>.*

Karahasanovic et al., Visualizing Impacts of Database Schema Changes—A Controlled Experiment, Proceedings of the IEEE Symposia on Human-Centric Computing Languages and Environments, Sep. 2001, p. 358-65, IEEE Computer Society, Washington, DC, United States.

Karahasanovic, Amela, Identifying Impacts of Database Schema Changes on Applications, Apr. 2001, The College of Information Sciences and Technology, <http://citeseerx.ist.psu.edu/viewdoc/summary?doi=10.1.1.4.7774>.

Maule, Andy et al., Impact Analysis of Database Schema Changes, Proceedings of the 30th international conference on Software engineering, May 2008, pp. 451-460, ACM, New York, New York, United States.

Lock, Simon et al., Systematic Change Impact Determination in Complex Object Database Schemata, Proceedings of the Workshop on Object-Oriented Technology, Jun. 1999, pp. 31-40, Springer-Verlag, London, United Kingdom.

IBM, IBM DB2 Change Management Expert for Multiplatforms: User's Guide, Jan. 2007, pp. 16-18, Version 1, Release 1, International Business Machines Corporation, Armonk, New York, United States.

* cited by examiner

Table definition example

```
CREATE TABLE ACT (
    ACTNO SMALLINT NOT NULL,
    ACTKWD CHAR(6) NOT NULL,
    ACTDESC VARCHAR(20) NOT NULL,
)
```

DDL statement example: Changing a column from integer to varchar

```
ALTER TABLE "SSURANGE"."ACT" ALTER COLUMN "ACTNO" SET DATA TYPE VARCHAR(5);
```

FIG. 5

DDL statement example: Changing a column from integer to varchar         600              520

ALTER TABLE "SSURANGE". "ACT" ALTER COLUMN "ACTNO" SET DATA TYPE VARCHAR(5);

```
import com.ibm.pdg.annotation.Table;
@Table (name = "ACT", schema = "SSURANGE" )
public class ActInLine {
    // Class variables
    @ Id
    public short actno;
    public String actkwd;
    public String actdesc;
    /**
     * Constructor for Act.
     */
    public ActInLine ( ) {
        super ( );
    }
    /**
     * Constructor for Act that sets all fields.
     */
    public ActInLine ( short actno, String actkwd, String actdesc ) {
        super ( );
        this . actno = actno;
        this . actkwd = actkwd;
        this . actdesc = actdesc;
```

} 610

Schemas
  SSURANGE
    ACT
      SELECT ACTNO, ACTKWD, ACTDESC FROM
        SSURANGE.ACT WHERE ACTNO = ?
        ActInLineSample.main:51
        ACTNO
          ActSample Inline . main : 36
          ActSample Inline . main : 37
          ActSample Inline . main : 38
          ActSample Inline . main : 39
          ActSample Inline . main : 42
          ActSample Inline . main : 43
          ActSample Inline . main : 44

IDENTIFYING IMPACT OF DATABASE CHANGES ON AN APPLICATION

CROSS-REFERENCE TO RELATED APPLICATIONS

This application is a continuation of co-pending U.S. patent application Ser. No. 12/255,946, filed Oct. 22, 2008. The aforementioned related patent application is herein incorporated by reference in its entirety.

BACKGROUND OF THE INVENTION

1. Field of the Invention

Embodiments of the invention relate to application development, and in particular, to application development tools for identifying impact of database changes on an application.

2. Description of the Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C or COBOL. SQL allows the user to manipulate data. The definitions for SQL provide that a RDBMS should respond to a particular query with a particular set of data given a specified database content.

Applications (i.e., application programs) communicate with relational databases using Structured Query Language (SQL). SQL statements are issued to the RDBMS, which executes the SQL statements to access a relational database. The SQL statements received from an application are executed within a "unit of work", which is a collection of related SQL statements. Once the SQL statements are executed they are either "committed" (i.e., the changes made by the executed SQL statements is made permanent in the relational database) or they are "rolled back" (i.e., the changes made by the executed SQL statements are removed, returning the relational database to the state it was in prior to execution of these statements.

SQL statements that involve modifying data (e.g., inserting, updating, or deleting rows) are called Data Manipulation Language (DML) statements. The SQL statements that involve defining database elements (e.g., defining data tables, views, or indexes) are called Data Definition Language (DDL) statements.

Tools are available for altering database schemas (e.g., tools used to generate DDL statements). However, such tools are disconnected from the tools for various artifacts that access them, such as applications, routines containing database access, and database web services. When proposing changes to database schemas via DDL, database administrators (DBAs) and developers cannot predict how the application and the artifact it accesses would be affected by the change.

SUMMARY OF THE INVENTION

One embodiment of the invention includes a method for assessing impacts to an application resulting from changes to a database accessed by the application. The method may generally include receiving a proposed database change; identifying one or more database objects of the database modified by the proposed database change; for each identified database object, analyzing source code of the application to identify one or more portions of the source code which access a respective database object; generating a reference to each portion of source code which accesses one of the identified database objects, wherein each reference links one of the identified portions of source code to a corresponding database object modified by the proposed database change; organizing the references in a hierarchy; and generating a display of the hierarchy of references, wherein the display allows a user to access a corresponding portion of source code by selecting one of the references.

Another embodiment of the invention includes a computer program product for assessing impacts to an application resulting from changes to a database accessed by the application. The computer program product may provide a computer usable medium having computer usable program code. The computer program code may be configured to receive a proposed database change, identify one or more database objects of the database modified by the proposed database change, and for each identified database object, analyze source code of the application to identify one or more portions of the source code which access a respective database object. The program code may be further configured to generate a reference to each portion of source code which accesses one of the identified database objects. Each reference links one of the identified portions of source code to a corresponding database object modified by the proposed database change. The program code may be further configured to organize the references in a hierarchy and generate a display of the hierarchy of references. The display allows a user to access a corresponding portion of source code by selecting one of the references.

Still another embodiment of the invention includes a system having a processor and a memory containing a program, which when executed by the processor is configured to perform an operation for assessing impacts to an application resulting from changes to a database accessed by the application. The operation may generally include receiving a proposed database change; identifying one or more database objects of the database modified by the proposed database change; for each identified database object, analyzing source code of the application to identify one or more portions of the source code which access a respective database object; generating a reference to each portion of source code which accesses one of the identified database objects, wherein each reference links one of the identified portions of source code to a corresponding database object modified by the proposed database change; organizing the references in a hierarchy; and generating a display of the hierarchy of references, wherein the display allows a user to access a corresponding portion of source code by selecting one of the references.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 illustrates an example of both a table definition and a DDL statement for changing a column of the table, according to one embodiment of the invention.

FIG. 6 illustrates a graphical user interface that displays impact analysis results for a DDL statement, highlighting variables and methods of a Java® application that access the affected column, according to one embodiment of the invention.

DETAILED DESCRIPTION OF THE PREFERRED EMBODIMENTS

Figure 1:
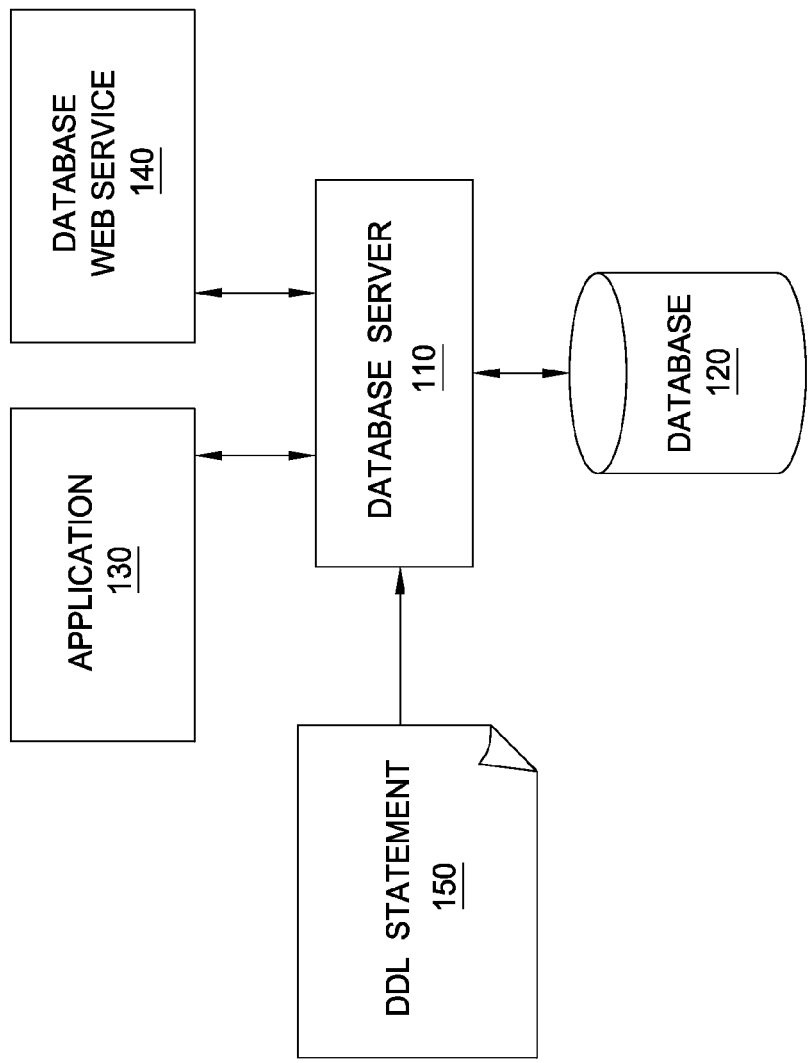
FIG. 1 is a block diagram illustrating dependencies between a database server and a set of applications and web services, according to one embodiment of the invention.

Embodiments of the invention provide techniques for identifying an impact that proposed database changes may have on an application configured to access the database. In one embodiment, given a proposed database change, source code affected by the change is identified. This technique may include accessing a SQL model associated with a proposed DDL statement and comparing the SQL model to a SQL model of a given application. References to the affected source code are created and organized into a hierarchy. Links are created from the hierarchy to the affected source code. By viewing the hierarchy, a user can identify how the proposed changes may impact the application. Further, the user can quickly access relevant portions of source code.

By browsing affected source code, a developer can determine the scope of change required before a DBA commits to a change in database schema. Furthermore, a developer can better ensure that sensitive information does not erroneously flow to unauthorized sources as an unintended consequence of a schema change. In addition, a developer can obtain similar insight in related application contexts, such as application frameworks and web services.

In team development, a developer can ascertain the scope of change required in her application, given proposed changes from a fellow developer. Teams can meet and tweak a DDL statement, and see the impact that each DDL statement may have on an application, facilitating team review and agreement on a particular schema change.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating dependencies between a database server and a set of applications and web services, according to one embodiment of the invention. As shown, an example computing environment 100 includes an application 140 and a database web service 150, each interface with a database server 120 to access a database 130. If a user executes a DDL statement 110 against the database 130 via the database server 120, the application 140 or the database web service 150 may be impacted by the database change caused by executing the DDL statement 110. Generally, web service 150 represent any program or software component that is accessible via software protocol such as web service, WSDL, REST, TCP/IP, network, (enterprise) service bus, Service Oriented Architecture, WSDL, URI, URL, RSH, RLogin, or remote procedure call. Further, database modifications may also include changes to database routines, stored procedures, user defined functions, user defined data types, constraint, and database triggers. Other database components which may be modified include artifacts generated for an object-relational mapping system such as EJB®, (Enterprise Java® Beans applications), JPA (Java® Persistence Architecture), JDO (Java® Data Objects), JAX-RPC and JAX-WS (Java® Remote Procedure Calls and Java® Web Services), and the Hibernate® object/relational persistence and query service, as well as other database models such as Entity-Relationship diagrams and UML (Unified Modeling Language) models.

Figure 2:
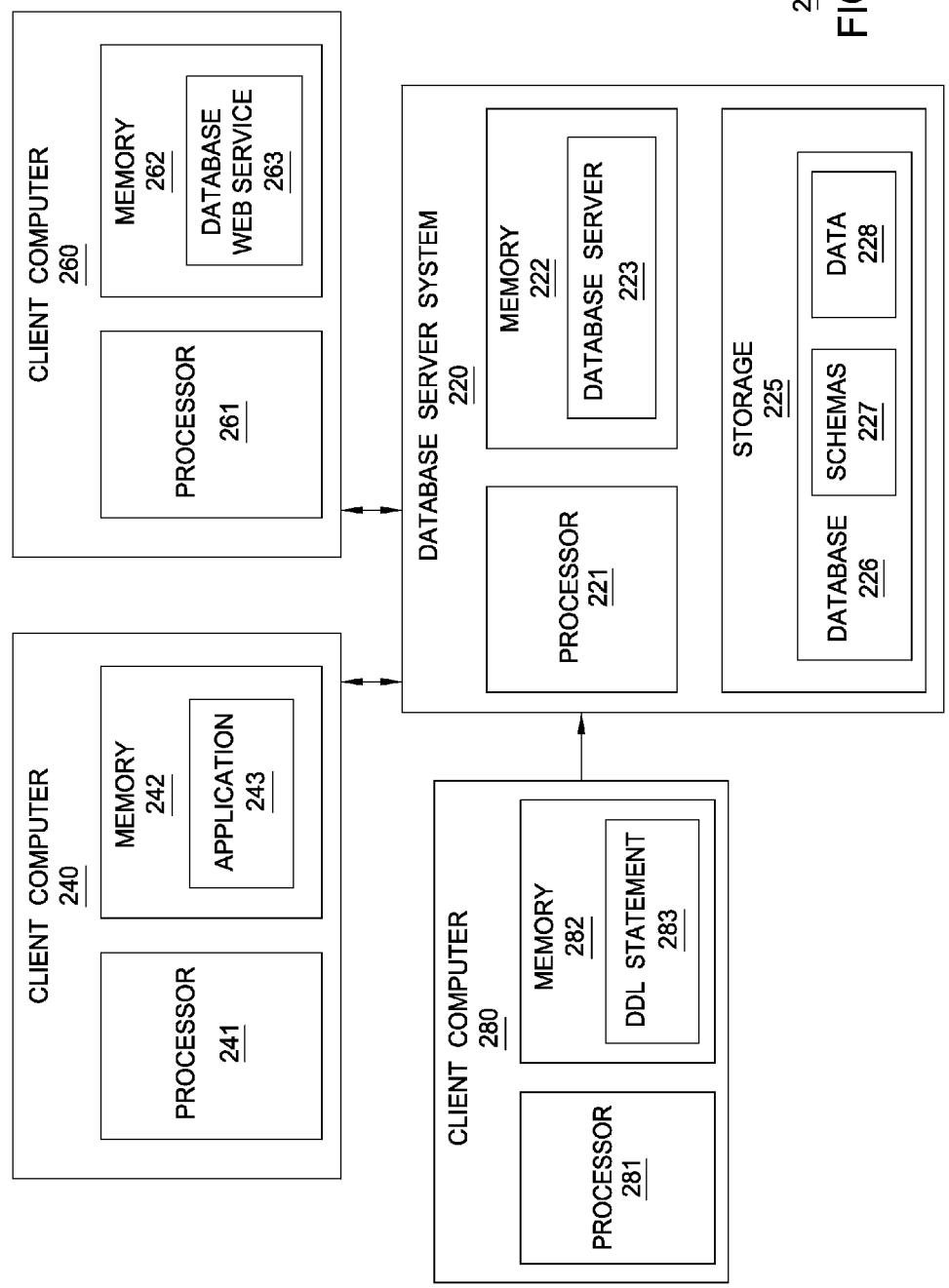
FIG. 2 is a block diagram illustrating a hardware environment of a database server and a set of dependent applications and web services, according to one embodiment of the invention.

FIG. 2 is a block diagram illustrating a hardware environment 200 of a database server and a set of dependent applications and web services, according to one embodiment of the invention. As shown, the hardware environment 200 includes client computers 220, 260, 280 and a database server system 240. In one embodiment, the computer systems illustrated in the hardware environment 200 may include existing computer systems, e.g., desktop computers, server computers, laptop computers, tablet computers, and the like. The computing environment 200 illustrated in FIG. 2, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 2 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, the database server system 220 includes a processor 221, which obtains instructions and data from memory 222 and storage 225. The processor 221 could be any processor adapted to support the methods of the invention. The memory 222 is any memory sufficiently large to hold the necessary programs and data structures. The memory 222 could be one or a combination of memory devices, including Random Access Memory, nonvolatile or backup memory (e.g., programmable or Flash memories, read-only memories, etc.). In addition, the memory 222 and the storage 225 may be considered to include memory physically located elsewhere in a server, for example, on another computer coupled to the database server 220. The database server system 220 may be operably connected to the network (not shown), which generally represents any kind of data communications network. Accordingly, the network may represent both local and wide area networks, including the Internet. On the database server system 220, a database server 223 resides in memory 222, with its associated database 226 residing in storage 225. Illustratively, database 226 includes one or more schemas 227 and data 228. Each schema 227 defines an organizational arrangement for a corresponding set of data 228.

As shown, client computers 240, 260, 280 each include a processor 241, 261, 281, which obtains instructions and data via a bus from a memory 222, 262, 282 and client storage. A processor 241, 261, 281 is a programmable logic device that performs all the instruction, logic, and mathematical processing in a computer. Client storage stores application programs and data for use by the client computer 240, 260, 280. Client storage includes hard-disk drives, flash memory devices, optical media and the like. A client computer 240, 260, 280 is operably connected to the network. Client memory 242, 262, 282 includes an operating system. The operating system is the software used for managing the operation of the client computer 240, 260, 280. Examples of operating systems include the UNIX® operating system, a version of the Microsoft Windows® operating system, and distributions of the Linux® operating system. (Note: Linux is a trademark of Linus Torvalds in the United States and other countries.)

As shown, client computer 240 includes an application 243 in memory 242 that accesses the database 226 via the database server 223. Similarly, client computer 260 includes a database web service 263 in memory 262 that accesses the database 226 via the database server 223. Further, client computer 280 includes a DDL statement 283 in memory 282, to be executed against the database 226 via the database server 223. However, executing the DDL statement 283 against database 226, may alter the database schemas 227 in ways that adversely affect the application 243 and/or the database web service 263. For example, DDL statements may rename or drop a column, or change the data type of a column. DDL statements may also rename or drop a table.

Figure 3:
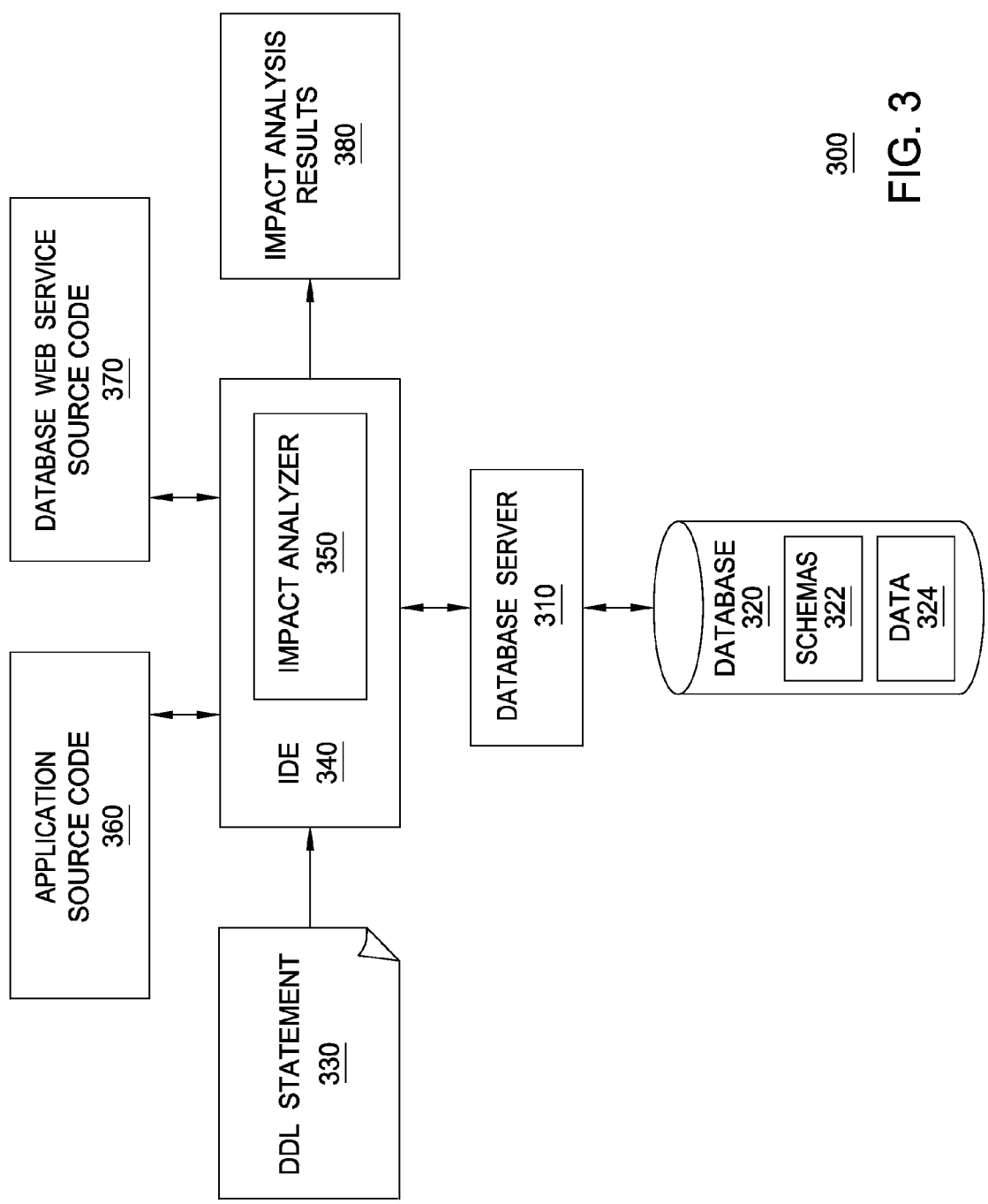
FIG. 3 is a block diagram illustrating inputs and outputs of an impact analyzer, according to one embodiment of the invention.

FIG. 3 is a block diagram illustrating a collection of inputs and outputs of an impact analyzer 350, according to one embodiment of the invention. As shown, the impact analyzer is integrated into an Integrated Development Environment (IDE) 340. In an IDE, computer users and programmers use a program editor to write computer programs and develop software applications in the form of source code. Alternatively source code may be obtained by other techniques such as decompiling an existing application. In one embodiment, the impact analyzer receives a DDL statement 330 and determines (without actually executing the DDL statement 330) how the DDL statement 330 may impact any applications or web services. The impact analyzer 350 outputs the impact analysis results 380 that show, in detail, the impacted applications and database web services. Such detail may be the affected workspaces, projects, and modules, or more specific, e.g., locations in source code files, methods, objects, and variables. For example, the impact analysis results 380 may list specific lines of the application source code 360 or web service source code 370 that would be affected by the DDL statement 330. The analysis results 380 enable a user to ascertain the extent of the impact of the DDL statement 330 on the application or web service.

Figure 4:
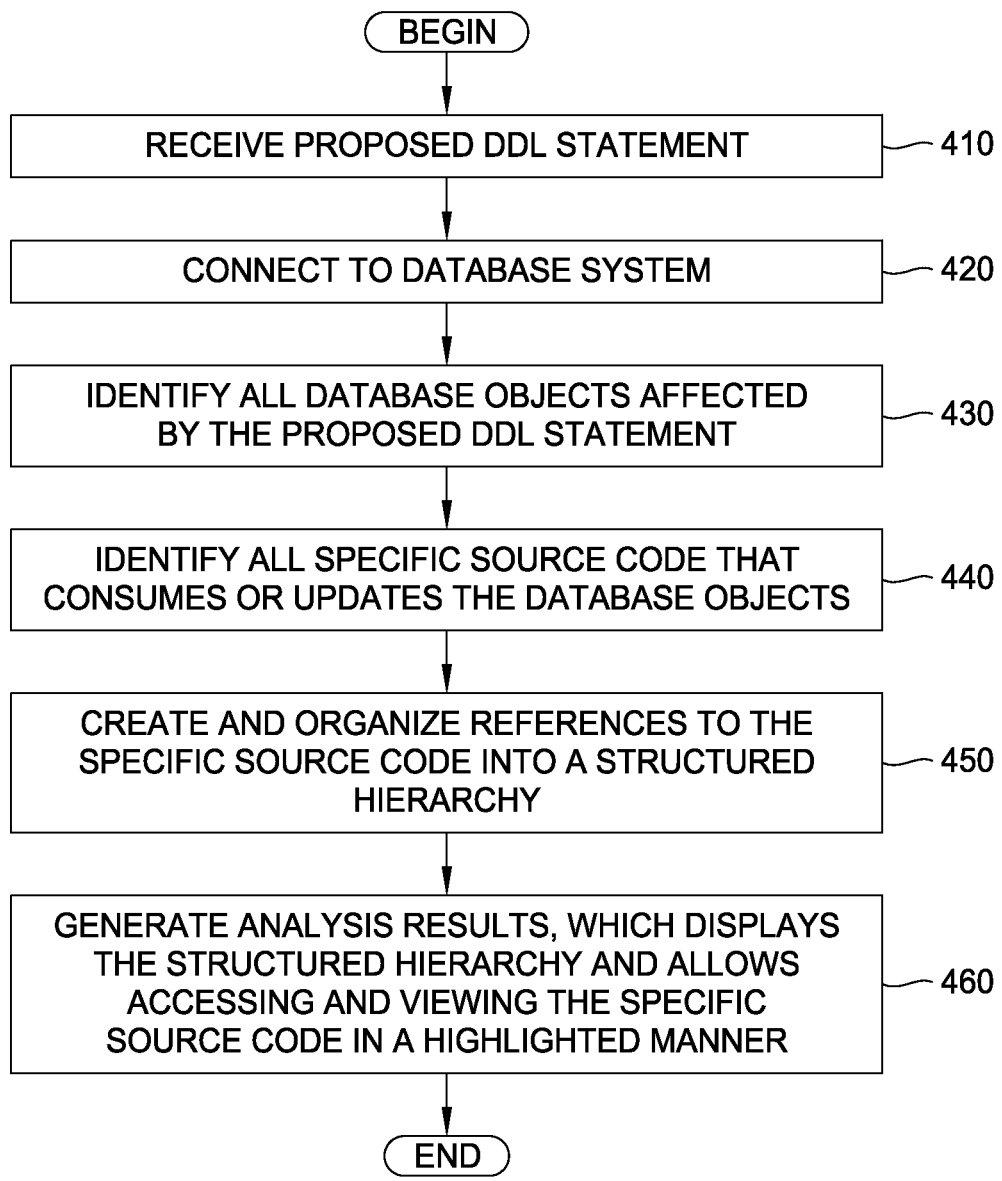
FIG. 4 is a flow diagram illustrating a method for identifying an impact of database changes on a set of applications and web services, according to one embodiment of the invention.

FIG. 4 is a flow diagram illustrating a method 400 for identifying an impact of database changes on a set of applications and web services, according to one embodiment of the invention. For the sake of illustration, the method 400 is described in conjunction with the system of FIG. 3. However, persons skilled in the art will understand that any system configured to perform the steps of the method 400, in any order, is within the scope of the present invention.

As shown, the method 400 begins at step 410, where a proposed DDL statement 330 is received by the impact analyzer 350. For example, assume a DDL statement for renaming the name of a table column is received. At step 420, the impact analyzer 350 connects to the database 320. Once connected the impact analyzer 350 may request information from the database describing the structure or schema of a particular database. Alternatively, this information may be determined from a model or other representation of database state. In such case, rather than connect to the actual database or DBMS system, the impact analyzer 350 may access the model describing the database. At step 430, the impact analyzer 350 identifies each database object affected by the proposed DDL statement. Examples of database objects include database, schemas, tables, table spaces, views, columns, constraints, privileges, primary keys, foreign keys, and procedures. For example, the impact analyzer 350 may identify the column renamed by the DDL statement.

In step 440, the impact analyzer identifies all application/web service objects and methods that access the database objects. For example, for a Java application, the impact analyzer 440 identifies source code that accesses the database column renamed by the DDL statement. At step 450, the impact analyzer 350 creates and organizes references to the affected source code into a hierarchy. The references include a source code filename and a line number. For example, the hierarchy may be grouped by source code filenames, and each filename is associated with a list of line numbers corresponding to the affected source code.

At step 460, the impact analyzer 350 generates analysis results 380, which displays the hierarchy and allows users to access and view the affected source code in a visually distinct (e.g., highlighted) manner. Further, additional output from the impact analyzer 350 may be generated, e.g., proposed actions to adapt the code and/or the SQL to the change. For example, assume the data type of a column is changed from a character to an integer, and that a function call in an application program may include a character (or string) variable used to store values from the column. In such a case, the impact analyzer 350 may suggest a modification to the function definition changing the character to an integer data type.

For example, the user may double-click on an entry in the hierarchy to access source code formatted in a visually distinct manner (e.g., highlighted). Thus, a user can ascertain expected impact of the DDL statement on a web application or web service by viewing the analysis results 380. In one embodiment, the impact analyzer 350 may support an edit mode, wherein a user can read and modify the affected source code and a read-only mode, wherein a user can read but not modify the affected source code. Further, the impact analyzer 350 may be a standalone tool or part of an IDE tool, such as the Eclipse® IDE. After step 450, method 400 terminates.

The hierarchy can be displayed as a tree widget in a user interface. In such a case, the tree may include nodes representing source code files. The nodes in the tree can display the names of the source code files, and can be expanded to show (or collapsed to hide) references to affected source code (for example, line numbers).

Once the user selects a reference using an input device, such as a mouse, the impact analyzer may display the associated source code file in a new user interface window. In addition, the impact analyzer 350 can scroll to the referenced location of the source code file, move the cursor to the referenced object or method, and format the appropriate source code in a visually distinct manner (highlight, underline, bold, etc.).

FIG. 5 illustrates an example of both a table definition 510 and a DDL statement 520 for changing a column of the table, according to one embodiment of the invention. Illustratively, the table definition 510 creates a table "ACT" with three fields: "ACTNO" of type SMALLINT, "ACTKWD" of type CHAR(6), and "ACTDESC" of type VARCHAR(20). The DDL statement 520 changes the ACTNO column from type SMALLINT to type VARCHAR(5). That is, the table definition includes three columns, two storing text characters and one storing numeric values.

FIG. 6 illustrates a graphical user interface that displays impact analysis results 380 for a DDL statement 520, according to one embodiment of the invention. The impact analysis results 380 also display a hierarchy of affected source code locations 620, wherein the hierarchy 620 is seamlessly integrated into the IDE, allowing the user to access particular affected source code via the hierarchy 620. Further, the impact analysis results also highlight 610 variables and methods that access the affected column.

Figure 7:
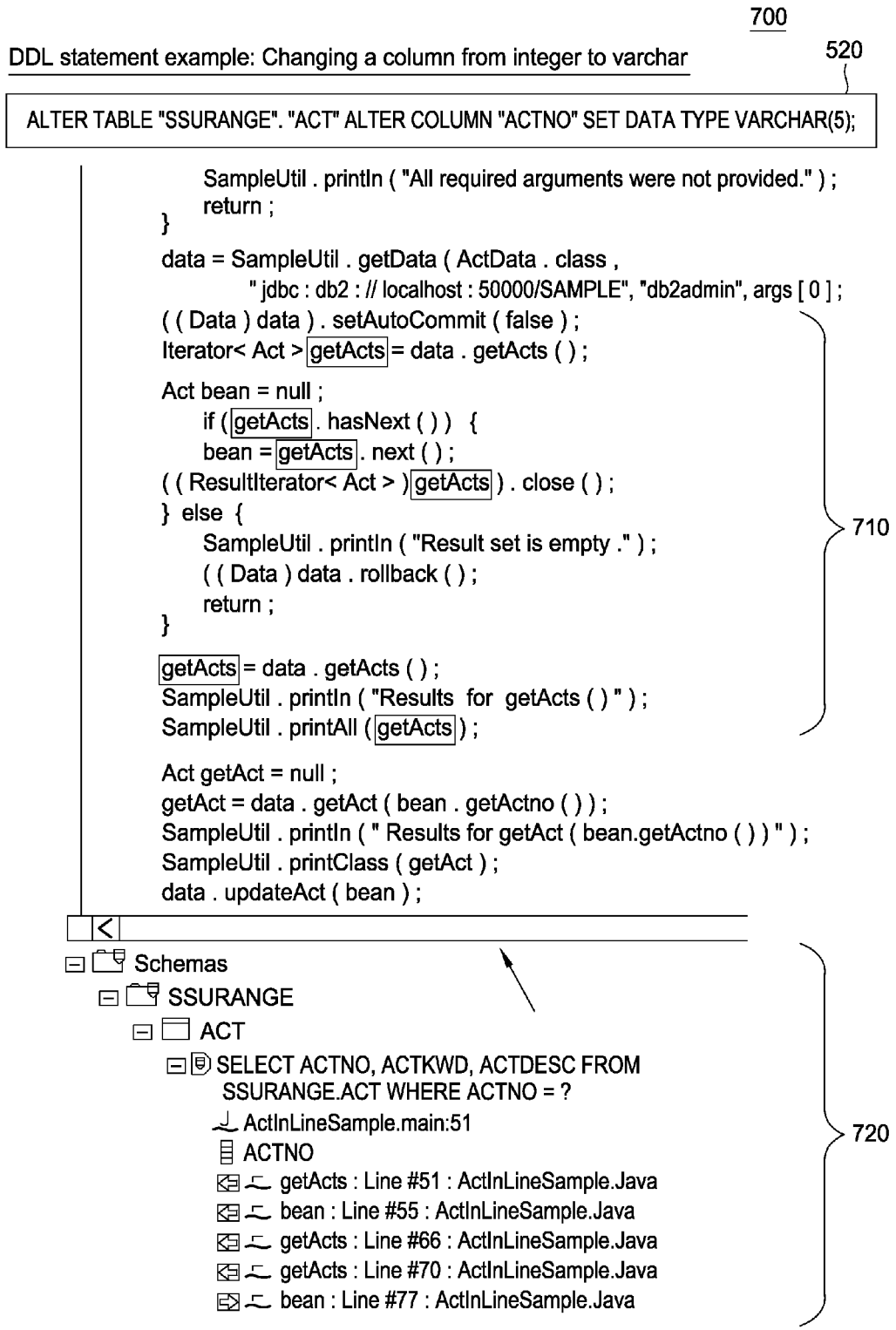
FIG. 7 illustrates another graphical user interface that displays impact analysis results for a DDL statement, highlighting objects and locations of a Java application that access the affected column, according to one embodiment of the invention.

FIG. 7 illustrates another graphical user interface of an IDE that displays the impact analysis results 380 of the DDL statement 520, according to one embodiment of the invention. The impact analysis results 380 also display a hierarchy of affected objects and their source code locations 720, wherein the hierarchy 720 is seamlessly integrated into the IDE, allowing the user to access particular source code locations via the hierarchy 720, according to one embodiment of the invention. Further, the impact analysis results also highlight 710 objects and locations that access the affected column.

Figure 8:
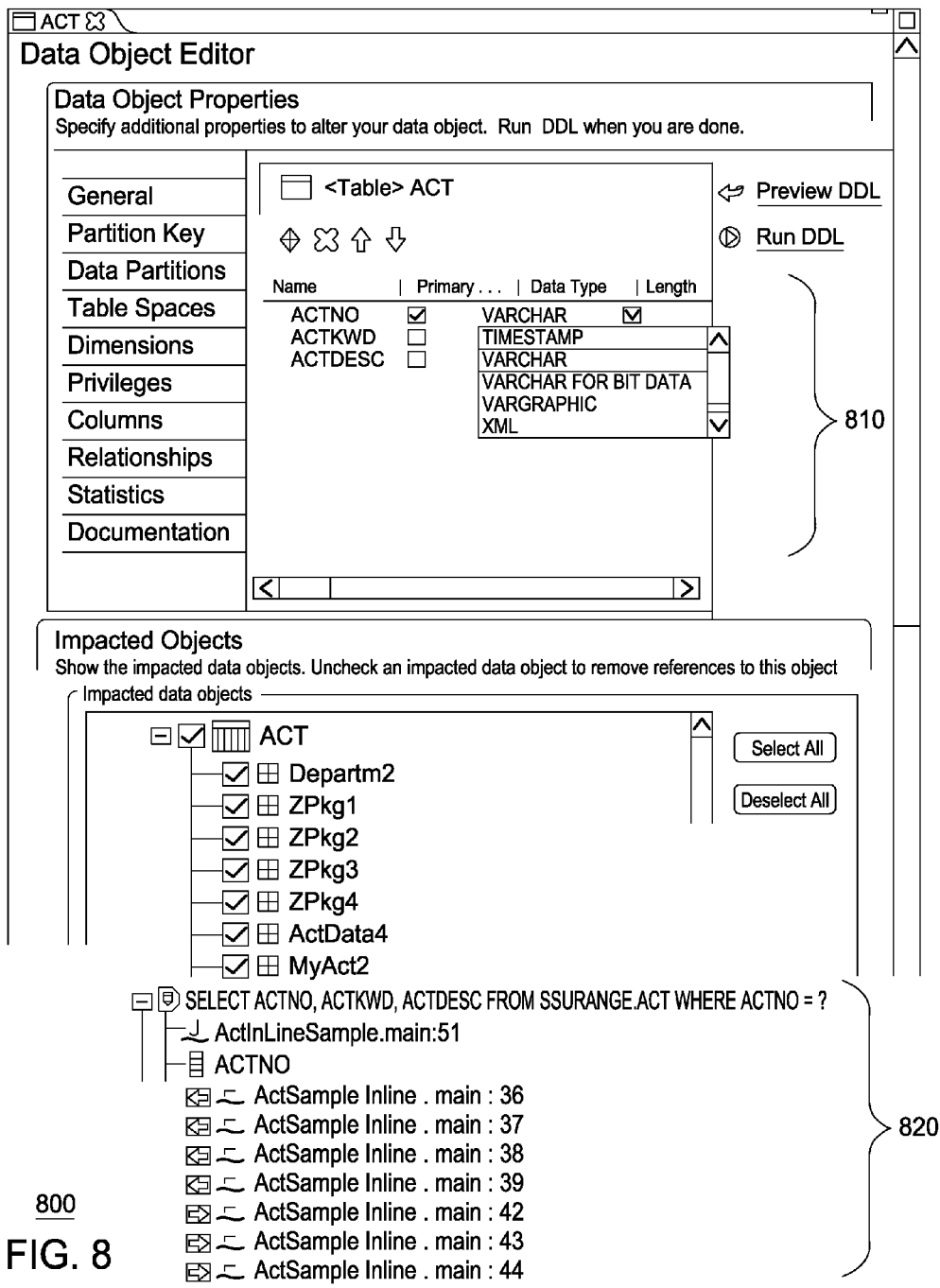
FIG. 8 illustrates a graphical user interface of a DDL query builder, displaying impact analysis results for the proposed column change, according to one embodiment of the invention.

FIG. 8 illustrates a graphical user interface of a DDL query builder 810 window of a database administration application, displaying the impact analysis results 380 for changing the ACTNO column type from SMALLINT to VARCHAR, according to one embodiment of the invention. The impact analysis results 380 also display a hierarchy of affected source code locations 820, wherein the hierarchy 820 is seamlessly integrated into the IDE, allowing the user to access particular source code locations via the hierarchy 820, according to one embodiment of the invention.

Figure 9:
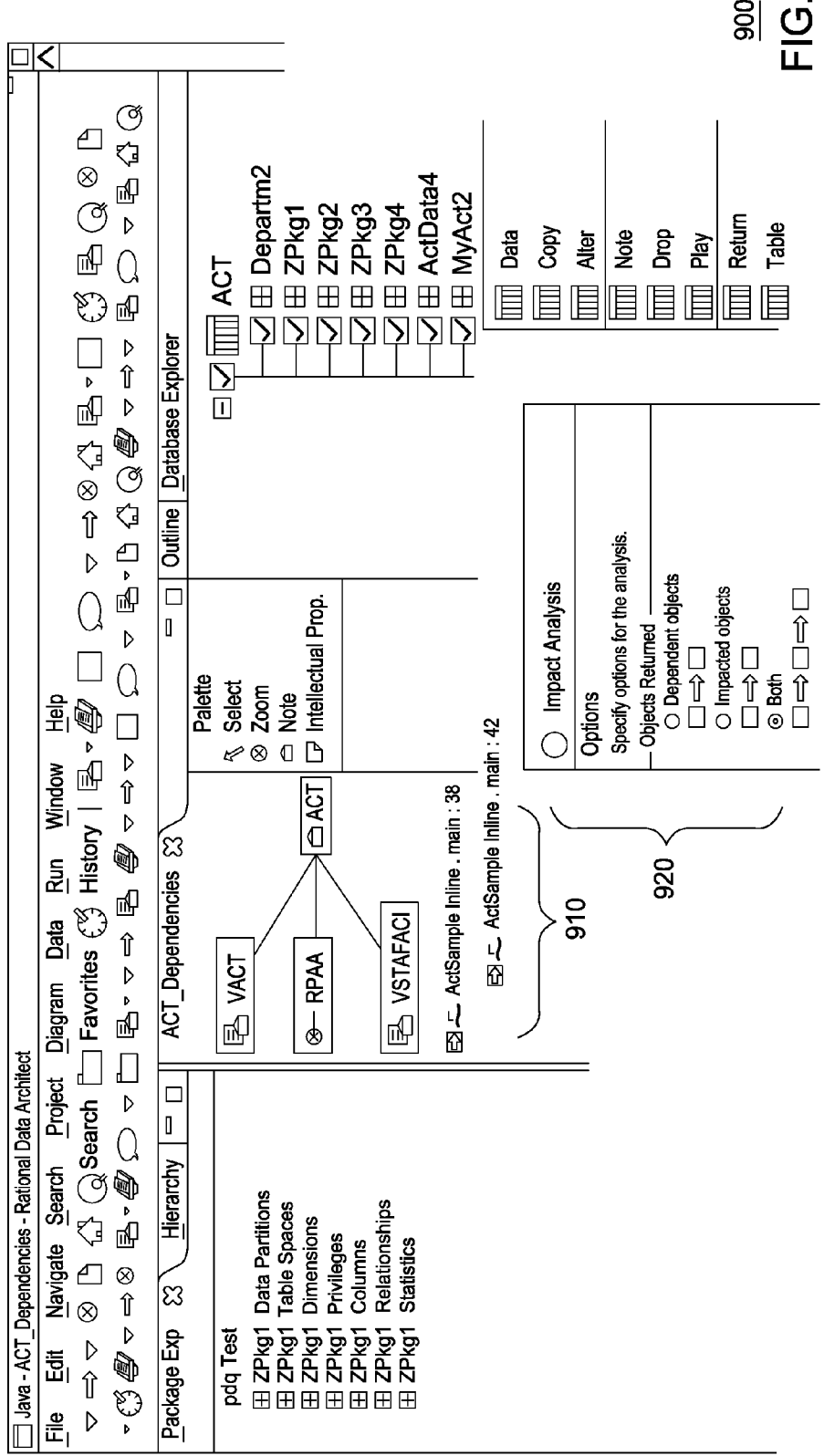
FIG. 9 illustrates a graphical user interface of a data modeling tool displaying impact analysis results for a proposed column change, according to one embodiment of the invention.

FIG. 9 illustrates a graphical user interface of a data modeling tool displaying the impact analysis results 380 for changing the ACTNO column type from SMALLINT to VARCHAR, according to one embodiment of the invention. The impact analysis results 380 display 910 the affected database objects, Java applications, and database services. The affected database objects may include tables, columns, column definitions, etc. The affected database objects may also include components of an object-relational mapping system such as EJB (Enterprise Java Beans), JPA (Java Persistence Architecture), JDO (Java Data Objects), JAX-RPC and JAX-WS (Java Remote Procedure Calls and Java Web Services), and Hibernate, as well as dartbase models such as Entity-Relationship diagrams and UML (Unified Modeling Language) models.

For the Java applications and database web services, the impact analysis results include references to Java source code and line numbers thereof to provide a clearer view of the impact of the column change.

Of course, the embodiments described herein are intended to be illustrative and not limiting of the invention, and other embodiments are broadly contemplated. Those skilled in the art will recognize, for example, that impact analyzer 350 may be a standalone application or be integrated into an IDE, database administration application, or data modeling tool.

Furthermore, the proposed database change may be in the form of an SQL DDL statement, or be specified via a query builder interface. Moreover, the application 130 may be written in any programming language that has database access capability (via libraries, extensions, modules, packages, etc.), such as the Java® or C/C++ programming languages. In addition, the hierarchy can be further organized by variable and method names; the affected source code can be from a specified workspace, project, application, or database web service; and the database object that is the target of the proposed database change may be a database, schema, table, table space, view, column, constraint, privilege, primary key, foreign key, procedure, etc.

While the foregoing is directed to embodiments of the present invention, other and further embodiments of the invention may be devised without departing from the basic scope thereof, and the scope thereof is determined by the claims that follow.

What is claimed is:

1. A computer-implemented method to assess impact to an application resulting from changes to a database accessed by the application, the method comprising:
   identifying one or more database objects of the database modified by a proposed database change;
   for each identified database object, analyzing source code of the application to identify one or more portions of the source code which access the respective database object;
   generating a reference to each portion of source code which accesses one of the identified database objects, wherein each reference links one of the identified portions of source code to a corresponding database object modified by the proposed database change, wherein each reference includes a source code filename and line number that identify a line of code impacted by the proposed database change;
   organizing the references in a hierarchy by operation of one or more computer processors; and
   generating an output of the hierarchy of references, wherein the output conveys impact of the proposed database change on the application and allows a user to access a corresponding portion of source code by selecting one of the references, whereby impact of the proposed database change on the application is assessed without requiring the proposed database change to be applied.

2. The computer-implemented method of claim 1, further comprising:
   generating an output of source code corresponding to a selected one of the hierarchy of references, wherein the source code corresponding to the selected reference is formatted to be visually distinct from other source code of the application.

3. The computer-implemented method of claim 1, wherein the proposed database change is in the form of a Structured Query Language (SQL) Data Definition Language (DDL) statement.

4. The computer-implemented method of claim 1, further comprising:
   generating a suggested modification to at least one of the portions of source code based on the modification to the corresponding database object specified by the proposed database change.

5. The computer-implemented method of claim 1, wherein the hierarchy is organized by a project name and a source code filename.

6. The computer-implemented method of claim 5, wherein the hierarchy is further organized by variable names and method names.

7. The computer-implemented method of claim 1, wherein each of the identified portions of the source code is from a specified workspace, project, application, or database web service.

8. The computer-implemented method of claim 1, wherein each identified database object is one of a database, schema, table, table space, view, column, constraint, privilege, primary key, foreign key, and procedure.

9. The computer-implemented method of claim 1, thereby facilitating access to the one or more identified portions of the source code.

10. The computer-implemented method of claim 9, wherein the method is performed by an impact analyzer component of an application, wherein the application comprises an integrated development environment (IDE).

11. The computer-implemented method of claim 10, further comprising:
    connecting to the database; and
    retrieving, from the database, a schema of the database;
    wherein the one or more data objects are identified based on the retrieved schema.

12. The computer-implemented method of claim 11, wherein the hierarchy is conveyed via a tree widget of a graphical user interface (GUI) of the IDE, wherein each node in the tree represents a distinct source code file.

13. The computer-implemented method of claim 12, wherein the IDE is configured to:
    upon receiving, via the GUI of the IDE, a user request to open source code associated with a first reference for viewing, open, in a source code GUI window, the source code for viewing while disallowing editing of the source code; and
    upon receiving, via the GUI of the IDE, a user request to open the source code associated with the first reference for editing, open, in the source code GUI window, the source code for editing.

14. The computer-implemented method of claim 13, wherein the IDE is further configured to:
    programmatically scroll, in the source code GUI window, to the line number of the source code and without requiring user input; and
    programmatically move a cursor, within a line of the source code identified by the line number, to a variable name that is impacted by the proposed database change and without requiring user input.

15. The computer-implemented method of claim 14, wherein the IDE is further configured to:
    convey the variable name in a manner that is visually distinctive relative to a second variable name that is not impacted by the proposed database change, without requiring user input.

16. The computer-implemented method of claim 15, further comprising:
    generating an output of source code corresponding to a selected one of the hierarchy of references, wherein the source code corresponding to the selected reference is conveyed in a manner that is visually distinct relative to other source code of the application.

17. The computer-implemented method of claim 16, further comprising:
    generating a suggested modification to at least one of the portions of source code based on the modification to the corresponding database object specified by the proposed database change.

18. The computer-implemented method of claim 17, wherein the proposed database change is in the form of a Structured Query Language (SQL) Data Definition Language (DDL) statement, wherein the hierarchy is grouped first by project name, second by source code filename, third by method name, and fourth by variable name.

19. The computer-implemented method of claim 18, wherein each of the identified portions of the source code is from an impacted workspace, an impacted project, an impacted application, and an impacted database web service, respectively.

20. The computer-implemented method of claim 19, wherein the one or more database objects include an impacted database, an impacted schema, an impacted table, an impacted table space, an impacted view, an impacted column, an impacted constraint, an impacted privilege, an impacted primary key, an impacted foreign key, and an impacted stored procedure.

* * * * *